(12) United States Patent
Tobisaka et al.

(10) Patent No.: US 6,672,112 B2
(45) Date of Patent: Jan. 6, 2004

(54) OVD APPARATUS INCLUDING AIR-REGULATING STRUCTURE

(75) Inventors: Yuuji Tobisaka, Annaka (JP); Tadakatsu Shimada, Annaka (JP); Hiroshi Machida, Annaka (JP); Masataka Watanabe, Annaka (JP); Hiroshi Tsumura, Annaka (JP); Hideo Hirasawa, Annaka (JP)

(73) Assignee: Shin-Etsu Chemical Co., Tokyo (JP)

( * ) Notice: Subject to any disclaimer, the term of this patent is extended or adjusted under 35 U.S.C. 154(b) by 0 days.

(21) Appl. No.: 10/373,224

(22) Filed: Feb. 26, 2003

(65) Prior Publication Data

US 2003/0126893 A1 Jul. 10, 2003

Related U.S. Application Data

(62) Division of application No. 09/609,389, filed on Jul. 3, 2000, now Pat. No. 6,546,759.

(30) Foreign Application Priority Data

| Jul. 2, 1999 | (JP) | 11-188829 |
| Jul. 9, 1999 | (JP) | 11-195254 |
| Jul. 22, 1999 | (JP) | 11-207039 |
| Jul. 23, 1999 | (JP) | 11-209177 |
| Jul. 30, 1999 | (JP) | 11-216731 |

(51) Int. Cl.[7] .................................. C03B 37/018
(52) U.S. Cl. ................ 65/484; 65/421; 65/531; 65/530
(58) Field of Search .................. 65/484, 421, 531, 65/530

(56) References Cited

U.S. PATENT DOCUMENTS

| 4,568,370 A | 2/1986 | Powers |
| 4,666,487 A | * 5/1987 | Gerault .................. 65/530 |
| 4,684,384 A | 8/1987 | Berkey |
| 4,740,226 A | * 4/1988 | Toda ...................... 65/532 |
| 5,221,306 A | 6/1993 | Fleming et al. |
| 5,772,720 A | 6/1998 | Taira-Griffin et al. |
| 5,850,497 A | 12/1998 | Fleming et al. |
| 5,958,102 A | 9/1999 | Shimada et al. |

FOREIGN PATENT DOCUMENTS

| DE | 19628958 | 1/1998 |
| EP | 476218 | 3/1992 |
| EP | 845441 | 6/1998 |
| JP | 3-109231 | 5/1991 |
| JP | 3-228845 | 10/1991 |
| JP | 4-270133 | * 9/1992 |
| JP | 4-292434 | 10/1992 |
| JP | 5-70168 | * 3/1993 |

OTHER PUBLICATIONS

Patent Abstracts of Japan, Suzuki, "Preparation of Optical Fiber Base Material," vol. 15, No. 256, Jun. 28, 1991 and JP 03 083831 A (Fujikura Ltd.), Apr. 9, 1991.

* cited by examiner

*Primary Examiner*—John Hoffmann
(74) *Attorney, Agent, or Firm*—Pillsbury Winthrop LLP

(57) ABSTRACT

An apparatus for manufacturing a glass base material, which is a base material of an optical fiber, comprising: a base rod, around and along which said glass base material is formed; a burner that hydrolyzes and accumulates a gas material, which is a base material of said glass base material, around and along said base rod; a first burner-moving-unit that moves said burner in a direction parallel with a longitudinal direction of said base rod; and a second burner-moving-unit that moves said first burner-moving-unit in a same moving direction of said first burner-moving-unit.

21 Claims, 9 Drawing Sheets

| EXAMPLE NUMBER | COOLING SPEED [C°/MIN] | CRACK OCCURRENCE |
|---|---|---|
| ① | 6.5 | O |
| ② | 11.6 | O |
| ③ | 20.4 | O |
| ④ | 30.5 | O |
| ⑤ | 46.0 | × |

OVD APPARATUS INCLUDING AIR-REGULATING STRUCTURE

This is a divisional of U.S. patent application Ser. No. 09/609,389, filed Jul. 3, 2000, now U.S. Pat. No. 6,546,759, which claims priority to Japanese Application Nos. 11-188829, filed Jul. 2, 1999; 11-195254, filed Jul. 9, 1999; 11-207039, filed Jul. 22, 1999; 11-209177, filed Jul. 23, 1999; and 11-216731, filed Jul. 30, 1999, the contents of which are incorporated in their entirety herein by reference.

BACKGROUND OF THE INVENTION

1. Field of the Invention

This invention relates to a glass base material, which is a base material of an optical fiber, manufacturing apparatus and a glass base material manufacturing method.

2. Description of the Related Art

There are several processes involved in the manufacture of an optical fiber. A gas material, which is a base material of an optical fiber, is hydrolyzed and formed into a glass base material. The glass base material is sintered to form an optical fiber preform, which is drawn to form an optical fiber.

There are several methods for manufacturing a glass base material. As one of the methods for manufacturing a glass base material, there is an OVD method, that is, an outside vapor deposition method. In the OVD method, a gas material is hydrolyzed by a burner to form glass particles which form the base material of the optical fiber. The glass particles are accumulated around and along a base rod, which is rotated at a constant speed, and the accumulated glass particles become a glass base material.

To increase the productivity of manufacture of glass base materials, a plurality of burners are used for hydrolyzing the gas material. The plurality of burners are moved back and forth along the longitudinal direction of the base rod, in order to form a glass base material having a constant diameter. The turning point of the back and forth movement of the burners needs to be dispersed evenly along the longitudinal direction of the base rod, so that the diameter of the glass base material accumulated by the burners can be constant for substantially the whole length of the glass base material.

There is a method of controlling the position of the turning point by using software that calculates the position of the turning point of the burners. To control the turning point to be a predetermined position, several steps have to be executed.

However, the method of controlling the turning points using software causes a delay in the movement of burners, because it takes time for the software to calculate the turning point and also takes time to provide the calculated turning points to the unit that moves the burners. The burners pass over the turning point which is to be calculated by the software and provided to the unit which moves the burners. Therefore, the diameter of the glass base material becomes uneven and the roughness of the surface of the glass base material increases. Therefore, the quality of the glass fiber drawn from the glass base material having an uneven diameter, decreases.

SUMMARY OF THE INVENTION

Therefore, it is an object of the present invention to provide an apparatus for glass base material manufacturing and a method for glass base material manufacturing which overcomes the above issues in the related art. This object is achieved by combinations described in the independent claims. The dependent claims define further advantageous and exemplary combinations of the present invention.

According to the first aspect of the present embodiment, an apparatus for manufacturing a glass base material, which is a base material of an optical fiber, can be provided. The apparatus may comprise a base rod, around and along which the glass base material may be formed; a burner that hydrolyzes and accumulates a gas material, which is a base material of the glass base material, around and along the base rod; a first burner-moving-unit that moves the burner in a direction parallel with a longitudinal direction of the base rod; and a second burner-moving-unit that moves the first burner-moving-unit in the same moving direction of the first burner-moving-unit.

The first burner-moving-unit may move the burner back and forth in the direction parallel with a longitudinal direction of the base rod. The second burner-moving-unit may move the first burner-moving-unit back and forth in the same movement direction as the first burner-moving-unit.

The first burner-moving-unit may move the burner at a first cycle, and the second burner-moving-unit may move the first burner-moving-unit at a second cycle, which is different from the first cycle. The first cycle maybe shorter than the second cycle, may be an integer multiple of the second cycle, and may be synchronized with the second cycle.

The apparatus may further comprise a plurality of burners arranged parallel to the longitudinal direction in the first burner-moving-unit. Each of intervals between the plurality of burners may be substantially constant. Each of the plurality of burners may accumulate in each different region, which is a part of the length of a whole length of the glass base material.

The first burner-moving-unit further may have a first shaft, along which the first burner-moving-unit moves, and the second burner-moving-unit further may have a second shaft along which the first burner-moving-unit moves. The first burner-moving-unit may have a first motor, which rotates the first shaft, and the second burner-moving-unit may have a second motor which rotates the second shaft.

A moving range of at least one of the first burner-moving-unit and the second burner-moving-unit may be an integer multiple of each of the intervals between the plurality of burners. The integer may be an integer which does not exceed a number of the plurality of burners divided by five. The integer may be the integer "1".

The apparatus may further comprise a chamber, which accommodates the base rod, the burner, the first moving unit, and the second moving unit, and includes a duct that vents exhaust from inside the chamber, provided in the longitudinal direction of the base rod for substantially the whole length of the chamber.

The chamber may have a tube shape running in the longitudinal direction, parallel to the base rod, both ends of which are closed. A cross section of the tube shape may be polygonal or a cylindrical shape. The duct may be provided on the top of the chamber. The duct may include a vent plate having a plurality of vents for substantially the whole length of the chamber. The plurality of vents may be provided at a constant interval. The vent plate may include a vent controller which controls airflow of the plurality of vents.

The chamber may further include a plurality of the ducts provided on the chamber, and the ducts may face an outlet of the burner located over the base rod. The chamber may include a base having a flow regulating structure which intakes outside air, thus regulating airflow flowing from the base to the duct. The flow regulating structure may be made of a filter. The filter may be made of a non-woven fabric. The filter may have an accordion shape. The flow regulating structure may be formed by a plate having a plurality of air holes.

The base rod may have a pair of dummy rods provided on both ends of the base rod, and the diameter of the dummy rod, D, and the weight of the glass base material, W, may have a relationship of $0.13 \leq D/W^{0.5}$. The diameter of the dummy rod, D, and the weight of the glass base material, W, may further have a relationship of $0.13 \leq D/W^{0.5} \leq 0.25$.

According to the second aspect of the present embodiment, a method for manufacturing a glass base material, which may be a base material of an optical fiber, comprises: rotating a base rod, around and along which the glass base material may be formed; hydrolyzing and accumulating a gas material, which is a base material of the glass base material, around and along the base rod using a burner; and the hydrolyzing and accumulating includes: moving the burner at a first cycle, in a direction parallel with a longitudinal direction of the base rod; and moving a unit, which moves the burner at the first cycle, at a second cycle in the same movement direction as the movement of the burner.

Moving the burner may move the burner back and forth in a direction parallel with the longitudinal direction of the base rod, and furthermore, the moving the unit may move the unit back and forth in the direction parallel with the longitudinal direction of the base rod.

The first cycle may be different from the second cycle, and may be shorter than the second cycle. The first cycle may be at integer multiple of the second cycle, and may be synchronized with the second cycle.

Hydrolyzing and accumulating may be performed by a plurality of the burners. Each of the plurality of the burners may be provided along the longitudinal direction of the base rod at a substantially constant interval. The hydrolyzing and accumulating process may accumulate the glass base material using each of the plurality of burners, and each of the plurality of burners may accumulate the gas material for each different region, which is a part of the length of the whole length of the base rod.

Moving the burner may move the burner for a distance which is an integer multiple of the interval, or moving the unit may move the unit for a distance which is an integer multiple of the interval. The integer may not exceed a number of the plurality of burners divided by five. The integer may be the integer "1".

The hydrolyzing and accumulating may accumulate the gas material in a chamber accommodating the base rod, the glass base material, the burner and the unit; and the hydrolyzing and accumulating may include controlling airflow which flows through the chamber. The controlling the airflow may include exhausting gas inside the chamber through a duct provided on the chamber for substantially the whole length of the chamber along the longitudinal direction of the base rod.

Controlling the airflow may further include exhausting the inside gas from a plurality of ducts provided on the chamber, the plurality of ducts facing an outlet of the burner across the base rod for substantially the whole length of the chamber along the longitudinal direction of the base rod. The exhausting may include exhausting the gas from inside the chamber through a vent plate, which has a plurality of vents provided for substantially the whole length of the chamber at a constant interval. The control of the airflow may include regulating airflow that flows from the base of the chamber. The regulating of the airflow may filter outside air.

The method may further comprise cooling the glass base material, which is accumulated by the hydrolyzing and accumulating, by controlling a surface temperature of the glass base material. The cooling may control a cooling speed for decreasing the surface temperature of the glass base material. The cooling may control the cooling speed to be slower than 30° C. per minute for a predetermined time after the hydrolyzing and accumulating is finished. The predetermined time may be ten minutes.

The hydrolyzing and accumulating may accumulate the gas material so that the relationship between the diameter of a pair of dummy rods provided on both ends of the base rod for holding the base rod, D, and a weight of the glass base material, W, may become $0.13 \leq D/W^{0.5}$. The hydrolyzing and accumulating may accumulate the gas material so that the relationship between the diameter of the pair of dummy rods, D, and the weight of the glass base material, W, may become $0.13 \leq D/W^{0.5} \leq 0.25$.

This summary of the invention does not necessarily describe all necessary features so that the invention may also be a sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
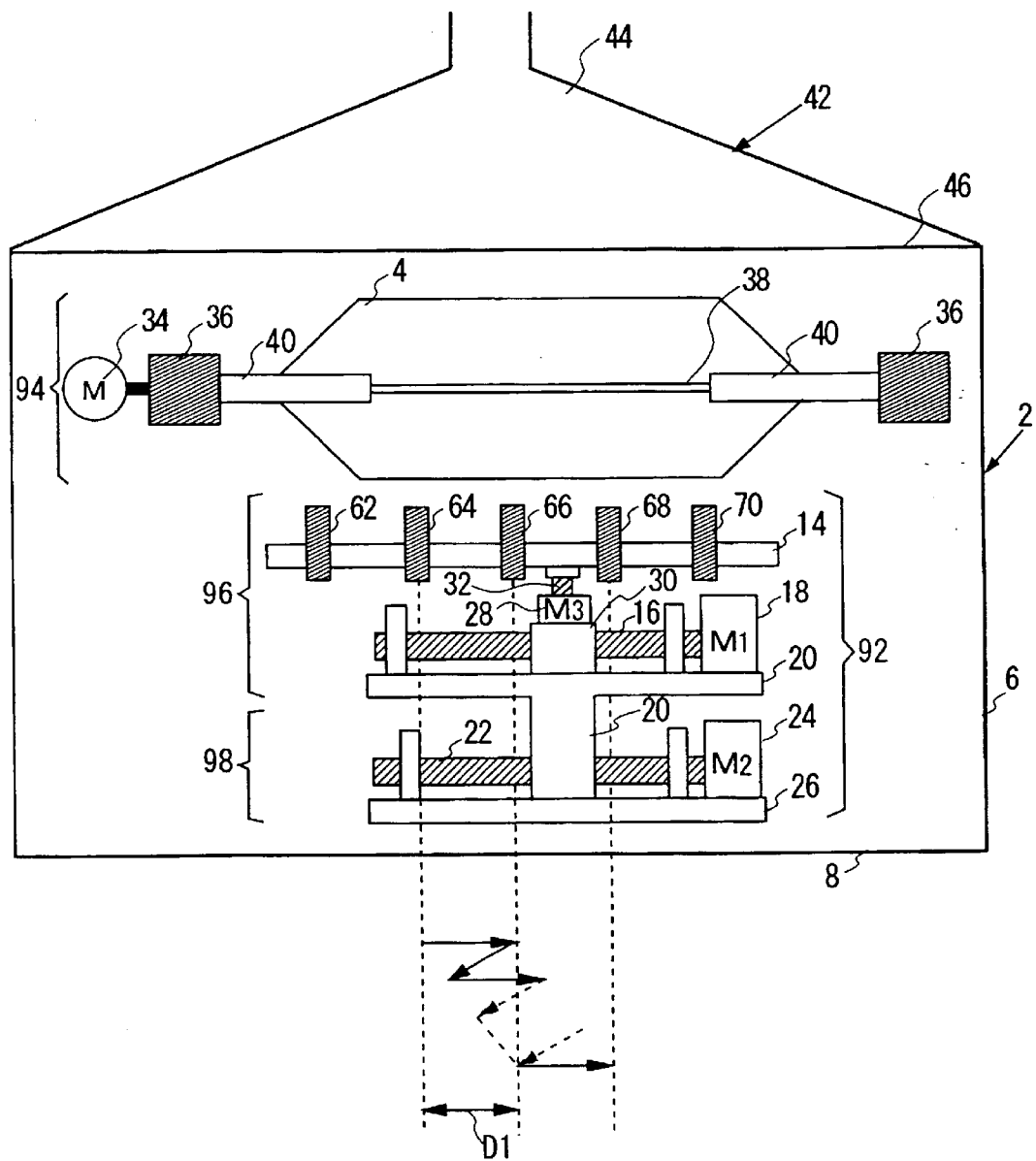
FIG. 1 shows a configuration of a glass base material manufacturing apparatus of the present embodiment.
Figure 2:
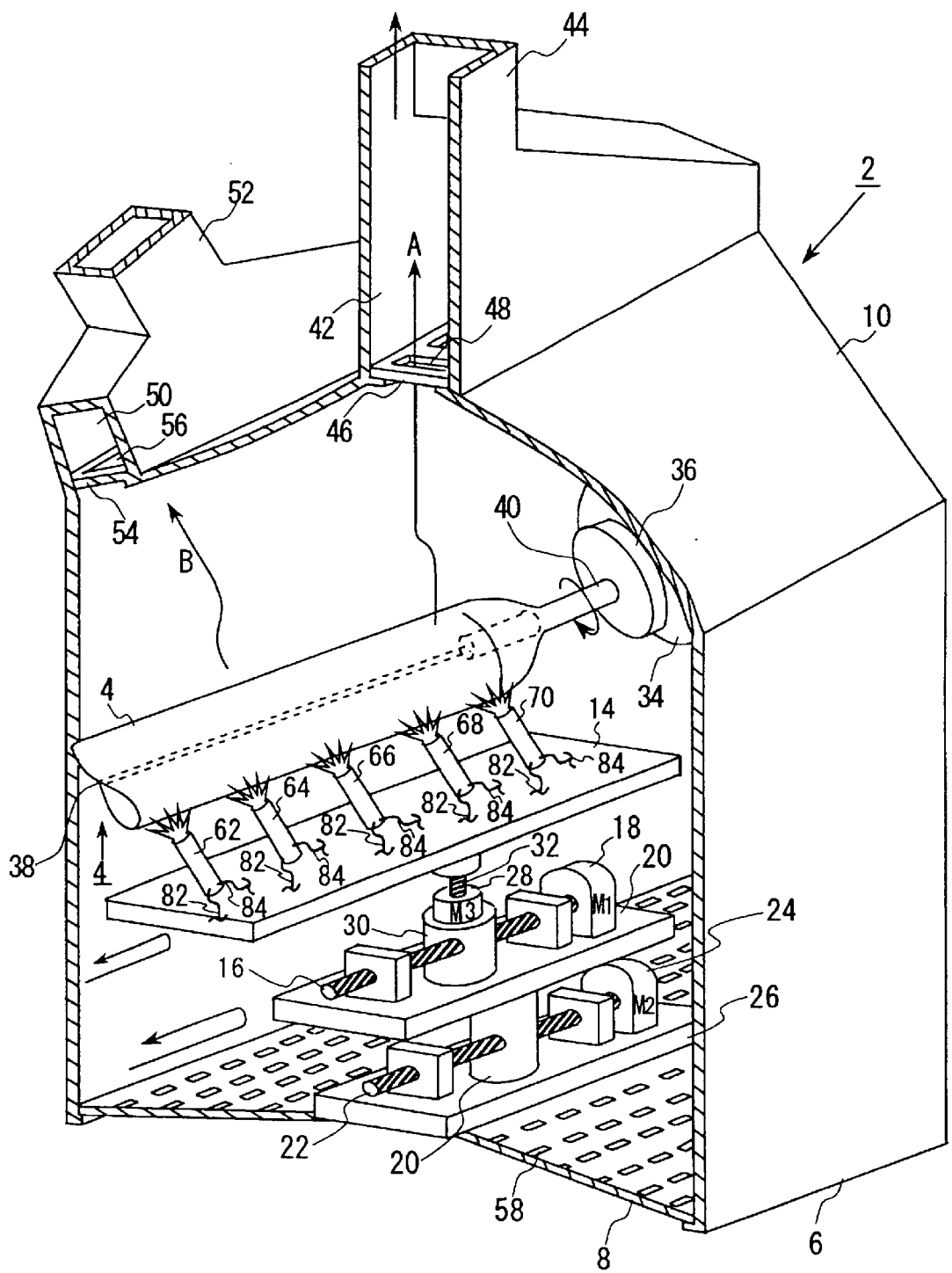
FIG. 2 shows a perspective view of the glass base material manufacturing apparatus of the present embodiment shown in FIG. 1.

FIG. 1 shows a configuration of a glass base material manufacturing apparatus of the present embodiment. FIG. 2 shows a perspective view of the glass base material manufacturing apparatus of the present embodiment shown in FIG. 1. The glass base material manufacturing apparatus has a burner-moving-unit 92, a base rod unit 94, a chamber 2, and a top duct 42.

The burner-moving-unit 92 has a first burner-moving-unit 96 and a second burner-moving-unit 98. The second burner-moving-unit 98 moves the first burner-moving-unit 96, and the first burner-moving-unit 96 moves a plurality of burners 62–70. Therefore, the movement of the burners 62–70 is the sum of the movement generated by the first burner-moving-unit 96 and the movement generated by the second burner-moving-unit 98.

The burner-moving-unit 92 and the rod unit 94 are provided inside the chamber 2, for manufacture of the glass base material 4. The top duct 42 is provided on the top of the chamber 2 to exhaust gas from inside the chamber 2. The burner-moving-unit 92 moves the burners 62–70 back and forth along the longitudinal direction of the base rod 38 whilst emitting glass particles from the burners 62–70, in order to accumulate glass particles on a base rod 38 of the rod unit 94, to manufacture a glass base material 4.

The first burner-moving-unit 96 includes the burners 62–70, a first stage 14, a first shaft 16, a first motor 18, a burner-adjusting shaft 32, a burner-adjusting motor 28, and a first stage base 30. The second burner-moving-unit 98 has a second stage 20, a second shaft 22, a second motor 24, and a base stage 26. Each of burners 62–70 has a fuel supply pipe 82, and a gas material supply pipe 84.

The base stage 26 is provided on the base 8. The second shaft 22 and the second motor 24 are provided on the base stage 26. The second shaft 22 is provided along the longitudinal direction of the base rod 38. The second motor 24 rotates the second shaft 22 in order to move the second stage 20 back and forth in the longitudinal direction of the base rod 38. The first shaft 16 and the first motor 18 are provided on the second stage 20. The first shaft 16 is provided along the longitudinal direction of the base rod 38. The first motor 18 rotates the first shaft 16 in order to move the first stage base 30 back and forth in the longitudinal direction of the base rod 38.

The burners 62–70 are provided on the first stage 14 in the longitudinal direction of the base rod 38, at a constant interval D1. As shown in FIG. 2, the gas material such as $SiCl_4$ is supplied from the gas material supply pipe 84, to the burners 62–70. Furthermore, fuel gas such as $O_2$ and $H_2$ are supplied from the fuel supply pipe 82 to the burners 62–70.

Burners 62–70 hydrolyze the gas material to generate the glass particles. The glass particles are emitted from the burners 62–70 to the base rod 38, in order to accumulate the glass particles on the base rod 38, which is rotated at a constant speed. The accumulated glass particles form a glass base material 4. Because the first motor 18 moves the first stage base 30 in order to move the first stage 14, on which the burners 62–70 are provided, the burners 62–70 move back and forth in the longitudinal direction of the base rod 38 whilst emitting the glass particles.

The burner-adjusting shaft 32 and the burner-adjusting motor 28 are provided on the first stage base 30. The first stage 14 is provided on the burner-adjusting shaft 32. The first stage 14 holds the burners 62–70. The burner adjusting-motor 28 rotates the burner-adjusting shaft 32, in order to move the first stage 14 in a vertical direction, to adjust the distance between the burners 62–70 and the base rod 38, so that the distance between the surface of the accumulated glass base material 4 and the burners 62–70 can be kept constant.

The base rod unit 94 has a base rod 38, a pair of chucks 36, a pair of dummy rods 40, and a rod motor 34. The glass base material 4 is manufactured on the base rod 38. Each pair of chucks 36 hold an outside end of both of the dummy rods 40 respectively. Each of the dummy rods 40 is provided on each end of the base rod 38. The rod motor 34 rotates the chucks 36 to rotate the base rod 38 at a constant speed, while the glass particles are accumulated on the base rod 38.

As shown in FIG. 2, the chamber 2 has side walls 6, a base 8, a roof 10, a top duct 42, and a side duct 50. The top duct 42 has a flue 44, a vent plate 46, and a plurality of vents 48. The side duct 50 has a side flue 52, a vent plate 54, and a plurality of vents 56. A plurality of air holes 58 which intake outside air, are provided substantially all over the base 8.

The chamber 2 accommodates the rod unit 94 and the burner-moving-unit 92. The base 8, the side walls 6, and a pair of the roof 10 constitute the chamber 2. The roof 10 is provided on the side walls 6. The top duct 42 is provided on the top of the roof 10 such that the bottom side of the top duct 42 can exhaust the gas from inside the chamber 2 from substantially the whole length of the chamber 2. The side duct 50 faces the outlets of the burners 62–70 over the base rod 38. The bottom side of the side duct 50 exhausts the gas inside the chamber 2 from substantially whole length of the chamber 2.

By providing substantially the same size air holes 58 substantially all over the base 8 at a constant interval, each of the air holes 58 intakes outside air evenly. The air holes 58 also regulate the airflow inside the chamber 2 and keep the airflow that flows into the chamber 2 smooth and constant. Furthermore, an accordion shaped filter made of non-woven fabric may also be used for the base 8. Foreign impurities contained in outside air can be filtered, by making the base 8 a filter. By making a filter in an accordion shape, the filter can have enough strength to support the burner-moving-unit 92.

The chamber 2 has a tube shape along the longitudinal direction of the base rod 38. The cross section of the tube shaped chamber 2 can be a polygonal, cylindrical, or curved shape. For example, the shape of the side wall 6 and the roof 10 can have a curved shape. The cross section of the chamber 2 except the top duct 42 and the side duct 50 is substantially the same along the longitudinal direction.

Because the cross section of the chamber 2 is substantially the same along the longitudinal direction, the airflow, which flows from the air holes 58 of the base 8 to the top duct 42 and the side duct 50, can be regulated constantly and evenly for substantially the entire longitudinal direction. Therefore the turbulence or vortexes occurring in the chamber 2 can be reduced.

The top duct 42 is provided on the uppermost top of the chamber 2. The vent plate 46 is provided inside the top duct 42, and separates the top duct 42 and the interior of the chamber 2. The vent plate 46 has a plurality of vents 48 provided at a constant interval for substantially the whole length of the chamber 2. The flue 44 is provided substantially at the center of the longitudinal direction of the chamber 2.

The side duct 50 is provided on the roof 10 of the chamber 2, such that the side duct 50 faces the outlets of the burners 62–70 which are located over the base rod 38. Similar to the top duct 42, the side duct 50 also has a vent plate 54, vents 56, and a side flue 52, each of which has a same function as the vent plate 46, the vents 48, and the flue 44, explained above.

The top duct 42 exhausts the gases inside the chamber 2 such as the air flowing through the chamber 2 from the base 8 to the top duct 42 and the side duct 50, by-products such as HCl gas, which is generated during hydrolyzing of the gas material, and glass particles, which do not accumulate on the glass base material 4. The glass particles, which do not accumulate on the glass base material 4, stick together and form a mass of glass particles. If the mass of the glass particles attaches to the glass base material 4, the density of the accumulated glass particles becomes uneven. Therefore the quality of the glass base material 4 decreases. If a glass base material 4 with an uneven density is sintered, bubbles may occur in the sintered glass base material 4. Because the top duct 42 is provided on the uppermost top of the chamber 2 for substantially the whole length of the chamber 2, the gas inside the chamber 2 can be exhausted outside the chamber 2 without creating turbulence or vortexes of airflow inside the chamber 2. The gas inside the chamber 2 gathered by the top duct 42 is exhausted through the vent plate 46 to the flue 44 using an electric fan for example.

Because the side duct 50 is provided on the corner of the chamber 2 whilst facing the outlets of the burners 62–70 over the base rod 38, a part of the gas inside the chamber 2, which flows from the bottom side of the glass base material 4 along the direction shown by the arrow B in FIG. 2, can be exhausted to the side duct 50. Therefore the gas inside the chamber 2 can be exhausted efficiently using high-speed airflow.

The chamber 2 of the present embodiment was tested. The chamber 2 includes the top duct 42 and the side duct 50 having a pentagonal shaped cross section. The area of the cross section was 4 m$^2$. The length of the chamber 2 was 5 m. The speed of exhausting the gas inside the chamber 2 was set to 30 m$^3$/min. The glass base material 4 manufactured by the above mentioned condition was sintered and inspected visually. No bubbles were found in the sintered glass base material 4.

Figures 3A, 3B, 3C:
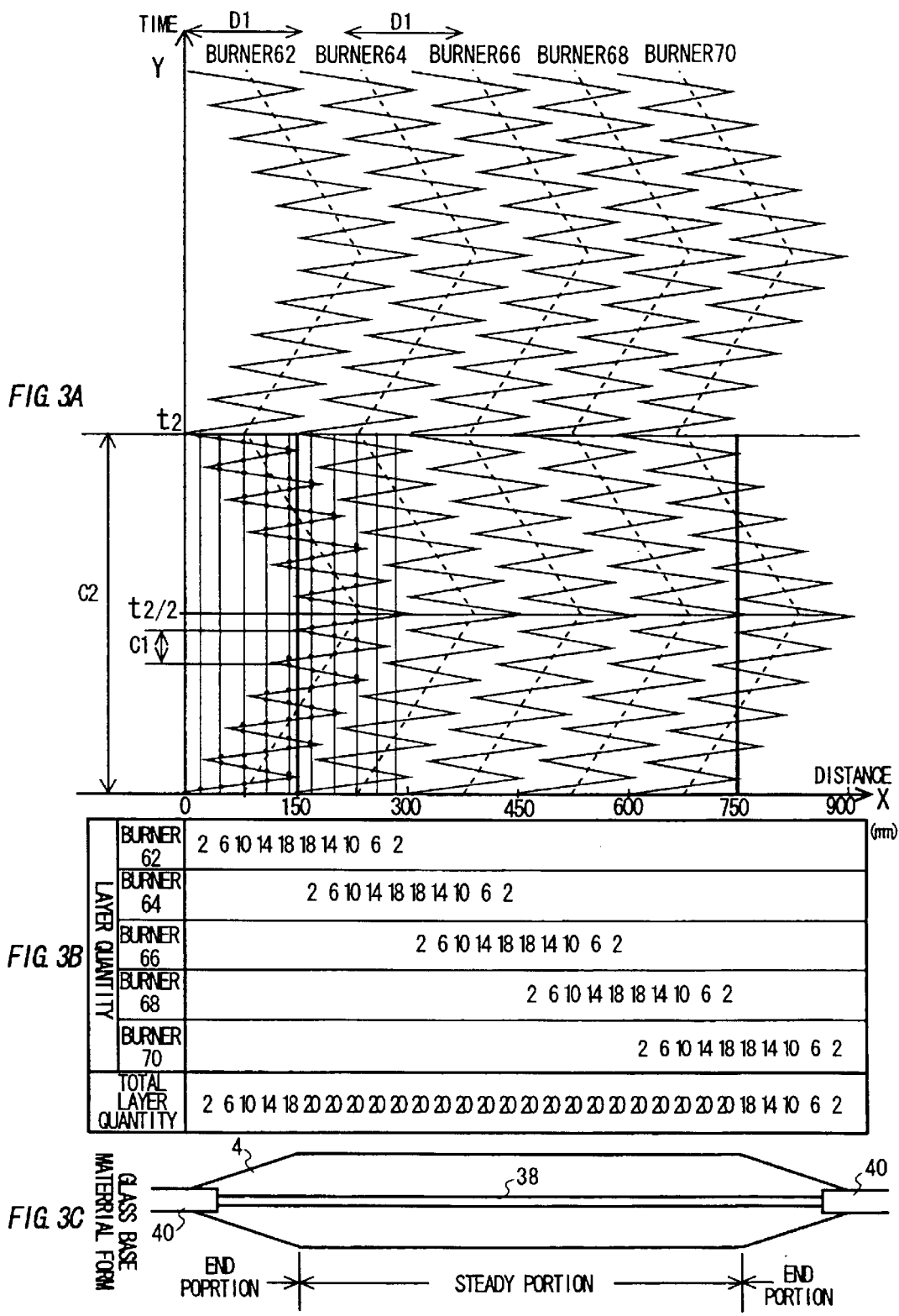
FIG. 3A shows a movement of the burners 62–70.
FIG. 3B shows quantities of layers of glass particles accumulated by the movement of the burners 62–70 shown in FIG. 3A.
FIG. 3C shows the form of the glass base material 4 made by the accumulation of the layers of the glass particles shown in FIG. 3B.

FIG. 3A shows movement of the burners 62–70. FIG. 3B shows quantities of layers of glass particles accumulated by the movement of the burners 62–70 shown in FIG. 3A. FIG. 3C shows the form of the glass base material 4 made by the accumulation of the layers of the glass particles shown in FIG. 3B.

In FIG. 3A, the X-axis shows a distance from the left end of the glass base material 4. The Y-axis shows time after the accumulation process starts. Here, the burners 62–70 are arranged at a constant interval of 150 mm as shown D1 in FIG. 1 and the top of the FIG. 3A. Both the moving range of the burners 62–70 relative to the second stage 20, and the second stage 20 are set to 150 mm, which is the same distance as the interval D1 between each of the burners 62–70. The moving range of the second stage 20 and the burners 62–70, however, are not limited to the same distance as the interval D1, and the moving range of the second stage 20 and the burners 62–70 can be a multiple of the interval D1 such as 150 mm, 300 mm, 450 mm, and so on, in the case shown in FIG. 3. Here, each of the burners 62–70 accumulates the substantially same amount of glass particles during the same period of time.

Five broken lines shown parallel to each other in FIG. 3A show the movement of the second stage 20, and five solid lines shown parallel to each other in FIG. 3A show the movement of the burners 62–70, which correspond to movement of the first stage 14. As shown in FIG. 1, the second motor 24 moves the second stage 20 back and forth, and the first motor 18, which is provided on the second stage 20, moves the first stage 14 back and forth. Therefore, the movement of the burners 62–70 shown by the zigzag shaped solid lines becomes the sum of the movement of the second stage 20 generated by the second motor 24, which are shown by the zigzag shaped broken lines, and the movement generated by the first motor 18.

The second motor 24 moves the second stage 20 back and forth at a cycle C2 as shown at the lower left of FIG. 3A. The first motor 18 moves the first stage 14 back and forth at a cycle C1 as shown at lower left of FIG. 3A.

Because the burners 62–70 are provided on the first stage 14, all the burners 62–70 move at the same cycle C1 within the same moving range.

The cycle C1 is synchronized with the cycle C2. For example, when time is 0 and t2, burners 62–70 are at the left most position of the moving range of the burners 62–70. At the same time, the second stage 20 is also at the left most position of the moving range of the second stage 20. When time is t2/2, the burners 62–70 are at the right most position of the moving range of the burners 62–70, and at the same time, the second stage 20 is also at the right most position of the moving range of the second stage 20.

In present embodiment, the cycle C1 is shorter than the cycle C2. Because the first stage 14 is provided on the second stage 20, the first stage 14 supports a smaller weight than the weight supported by the second stage 20. Therefore it is easier to move the first stage 14 faster than the moving speed of the second stage 20.

FIG. 3B shows the quantity of the layers of glass particles accumulated by the movement of the burners 62–70 shown above. The quantities of the layers accumulated by each of the burners 62–70 during the cycle C2 is shown in each row of FIG. 3B.

Now, the quantity of layers accumulated by the burner 62 is used for an explanation. As shown in the lower left of FIG. 3A, vertical lines are drawn parallel to the Y-axis at a 30 mm interval. The number of times of which the burner 62 has passed through the predetermined point, shown by the vertical lines, during the cycle C2 is counted. The number of times which the burner 62 passed through each vertical line becomes the number of layers of glass particles accumulated on the base rod 38 at each location of the vertical line. Because the burner 62 moves in a zigzag while changing turning point at the same interval of 30 mm as shown by the solid line, the burner 62 passes the first vertical line, which is the first vertical line from the distance 0 mm, twice during the cycle C2. Then, the burner 62 passes the second vertical line, which is the second vertical line from the distance 0 mm, six times during the cycle C2.

Similarly, the burner 62 passes the third, fourth, fifth, sixth, seventh, eighth, ninth, and tenth vertical lines for ten, fourteen, eighteen, eighteen, fourteen, ten, six, and two times, respectively, during the cycle C2. Also, in each row of FIG. 3B, the quantity of layers accumulated by each of the burners 64, 66, 68, and 70 are shown at predetermined positions, which are located at 30 mm intervals from the first vertical line of the burner 62. Each of the plurality of burners 62–70 accumulates in each different region, which is a part of the whole length of the glass base material 4.

Because the movement of each of the burners 64–70 is the same as the movement of the burner 62, the quantity of layers to be accumulated by each of the burners 64–70 at each of the predetermined positions is the same as the quantity of layers accumulated by the burner 62 at each of the predetermined positions shown by the vertical lines.

The total quantity of layers accumulated by the burners 62–70 is shown in the lowest row of FIG. 3B. The sum of the quantities of layers is calculated for each of the predetermined positions, which are located at 30 mm intervals from the first vertical line shown as vertical lines in the lower left of FIG. 3A. As shown in FIG. 3B, the total quantity of layers of glass particles is a constant value of 20 layers, from 150 mm to 750 mm along the X-axis of FIG. 3A.

FIG. 3C shows the cross-section along the longitudinal direction of the glass base material 4 manufactured by the glass base manufacturing apparatus of the present embodiment. The diameter of the glass base material 4 at each of the predetermined positions of the vertical lines of FIG. 3A corresponds to the total quantity of layers of glass particles shown in the lowest row of FIG. 3B. The portion of the glass base material 4 having a constant diameter, which corresponds to a total of 20 layers shown in FIG. 3B, that is, located from 150 mm to 750 mm along X-axis of FIG. 3A, is shown as a steady portion. The portions of the glass base material 4 where the diameter gradually increases or decreases, which corresponds to the total number of layers from 2 to 18, that is, located from 0 mm to 150 mm, and from 750 mm to 900 mm, are shown as end portions. As shown in FIG. 3C, the diameter of the glass base material 4 is constant along the longitudinal direction of the glass base material 4 within the steady portion.

Therefore, the present embodiment can manufacture a glass base material 4 having a constant diameter along the longitudinal direction of the glass base material 4 within the steady portion, by moving the burners 62–70 using the first burner-moving-unit 96 and the second burner-moving-unit 98.

Because the turning point of the burners 62–70 is controlled mechanically by the first burner-moving-unit 96 and the second burner-moving-unit 98, the current position of the burners 62–70 does not need to be observed for control of the movement of the burner-moving-unit 92. Furthermore, the present embodiment does not cause delay due to the calculation of the turning points and transfer of the data of the turning points, when using software to calculate the turning points. Therefore, the apparatus of the present embodiment can move the burners 62–70 accurately.

Two types of glass base material manufacturing apparatus were tested. First, the apparatus of the present embodiment was tested. The interval D1 between burners 62–70 was set to 150 mm. A base rod 38 having a diameter of 40 mm was used. The length of the base rod 38 was 200 mm. The first stage moving range and the second stage moving range were set to 150 mm, which is the same as the interval D1 between each of the burners 62–70. The moving speed of the first stage 14 was set to 1000 mm/min. The moving speed of the second stage 20 was set to 20 mm/min.

The gas material, $SiCl_4$ was supplied from the gas material supply pipe 84 to the burners 62–70. The rate of supply of the gas material to the burners 62–70 was 1 l/min when the hydrolyzing process started, and increased gradually to 5 l/min, which is the rate at the time when the hydrolyzing process ended, that is, the time when the diameter of the glass base material 4 became 200 mm. The fuel gas, $H_2$ and $O_2$ was supplied from the fuel supply pipe 82 to the burners 62–70. The rate of supply of the $H_2$ gas to the burners 62–70 was 40 l/min when the hydrolyzing process started, and increased gradually to 150 l/min, which is the rate at the time when the hydrolyzing process ended, that is, the time when the diameter of the glass base material 4 became 200 mm. The rate of supply of $O_2$ gas to the burners 62–70 was 20 l/min when the hydrolyzing process started, and increased gradually to 70 l/min, which is the rate at the time when the hydrolyzing process ended, that is, the time when the diameter of the glass base material 4 became 200 mm.

The base rod 38 was rotated at a speed of 30 rpm while manufacturing the glass base material 4. The gas material was hydrolyzed by the burners 62–70, in order to form glass particles which accumulated on the base rod 38, until the diameter of the glass base material 4 became 200 mm.

After accumulation of the glass particles was completed, the maximum diameter "M" and the minimum diameter "m" of the glass base material 4 of the steady portion were measured. The roughness of the surface of the glass base material 4, R, was calculated by the equation, $R=(M-m)/M$.

The roughness of the glass base material 4 manufactured by the present embodiment was less than 1%.

The conventional glass base material manufacturing apparatus having only one burner-moving-unit was tested. The movement of the burners 62–70 was controlled by software which calculates the positions of the turning points of the burners 62–70. The positions of the turning points calculated by the software were set to the same turning points as the present embodiment.

A glass base material 4 was manufactured using the conventional apparatus described above, and then the roughness of the glass base material 4 was measured. The roughness of the glass base material 4 manufactured by the conventional apparatus was about 8%, which was larger than the roughness of the present embodiment.

Figure 4:
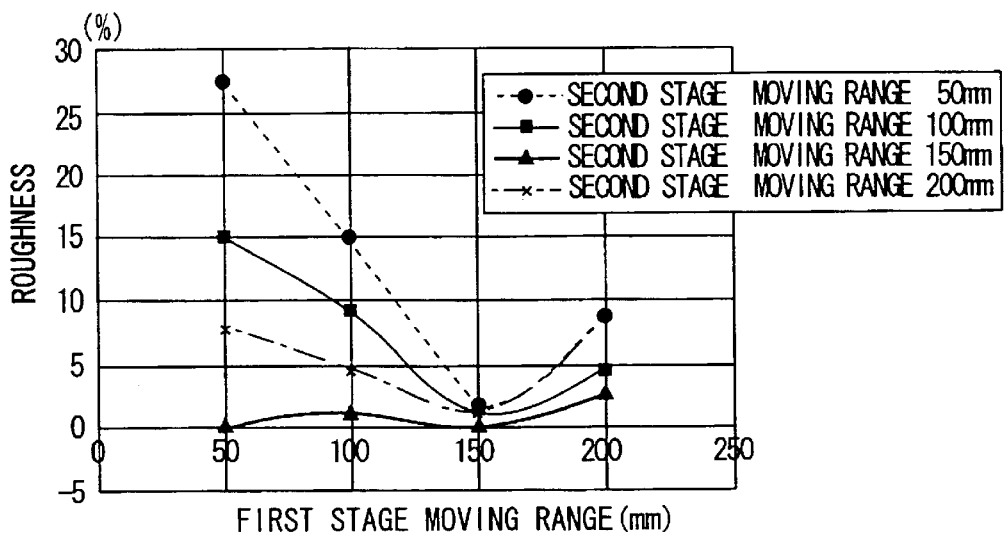
FIG. 4 shows the relationship between the roughness of the surface of the glass base material 4 for each moving range of the first stage 14 and the moving range of the second stage 20.
Figure 5:
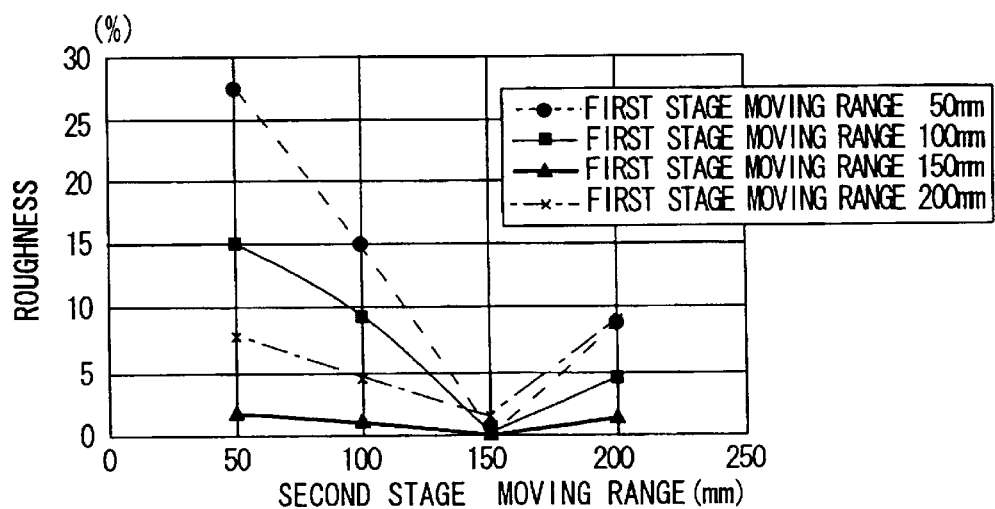
FIG. 5 shows the relationship between the roughness of the surface of the glass base material 4 for each moving range of the second stage 20 and the moving range of the first stage 14.

FIG. 4 and FIG. 5 show the relationship between the roughness of the surface of the glass base material 4 for each moving range of the first stage 14 and the moving range of the second stage 20. The roughness at each of the moving ranges of the first stage 14 for every 50 mm from 50 mm to 200 mm is shown in FIG. 4. The distance between each of the burners 62–70 is fixed to 150 mm. Here, the moving range of the first stage 14 is called a "first stage moving range" and the moving range of the second stage 20 is called a "second stage moving range". The roughness of the surface of the glass base material 4 is defined as follows. After accumulating the glass particles is finished, the diameter of the glass base material is measured for the whole length of the steady portion. Each of the maximum diameter, the minimum diameter, and the roughness of the surface of the glass base material 4 are represented by M, m, and R, respectively, and the roughness of the surface of the glass base material 4 is defined by $R=(M-m)/M$.

In FIG. 4, the X-axis shows the first stage moving range, and the Y-axis shows the roughness of the surface of the glass base material 4. The roughness becomes the largest value when the second stage moving range is 50 mm for the whole of the first stage moving range. When the second stage moving range is 150 mm, which is the same distance as the interval D1 between each of the burners 62–70, the roughness becomes the least for the whole of the first stage moving range.

Next, the roughness for a specific second stage moving range will be explained. Here, a second stage moving range of 50 mm will be used for example. The roughness becomes the greatest at the 50 mm point of the first stage moving range. The roughness becomes smaller than the 50 mm of the first stage moving range when first stage moving range is 100 mm. The roughness is the smallest when the first stage moving range is 150 mm. At the 200 mm point of the first stage moving range, the roughness becomes larger than the roughness at the 150 mm point of the first stage moving range. Therefore, the roughness becomes the smallest when the first stage moving range is 150 mm, when the second stage moving range is 50 mm. Not only when the second stage moving range is 50 mm, but also when the second stage moving range is 100 mm, 150 mm, and 200 mm, the roughness becomes the smallest, provided the first stage moving range is 150 mm. Therefore, it is preferable to set both the first stage moving range and the second stage moving range to 150 mm.

In FIG. 5, the X-axis shows the second stage moving range, and the Y-axis shows the roughness of the surface of the glass base material 4. The roughness becomes the largest value when the first stage moving range is 50 mm for the whole of the second stage moving range. When the first stage moving range is 150 mm, which is the same distance as the interval D1 between each of the burners 62–70, the roughness becomes the least for the whole of the second stage moving range.

Next, the roughness of a specific first stage moving range will be explained. Here, a first stage moving range of 50 mm will be used as an example. The roughness becomes the greatest at the initial 50 mm of the second stage moving range. The roughness becomes smaller than the 50 mm of the second stage moving range when second stage moving range is 100 mm. The roughness is the smallest when the second stage moving range is 150 mm. At the 200 mm point of the second stage moving range, the roughness becomes larger than the roughness at the 150 mm point of the second stage moving range. Therefore, the roughness becomes the smallest when the second stage moving range is at the 150 mm point, when the first stage moving range is 50 mm. Not only when the first stage moving range is 50 mm, but also when the first stage moving range is 100 mm, 150 mm, and 200 mm, the roughness becomes the smallest, provided the second stage moving range is 150 mm. Therefore, it is preferable to set both the first stage moving range and the second stage moving range to be 150 mm.

As shown above, the roughness becomes the smallest when both the first stage moving range and the second stage moving range are 150 mm, which is same as the interval D1 between each of the burners 62–70.

Figure 6:
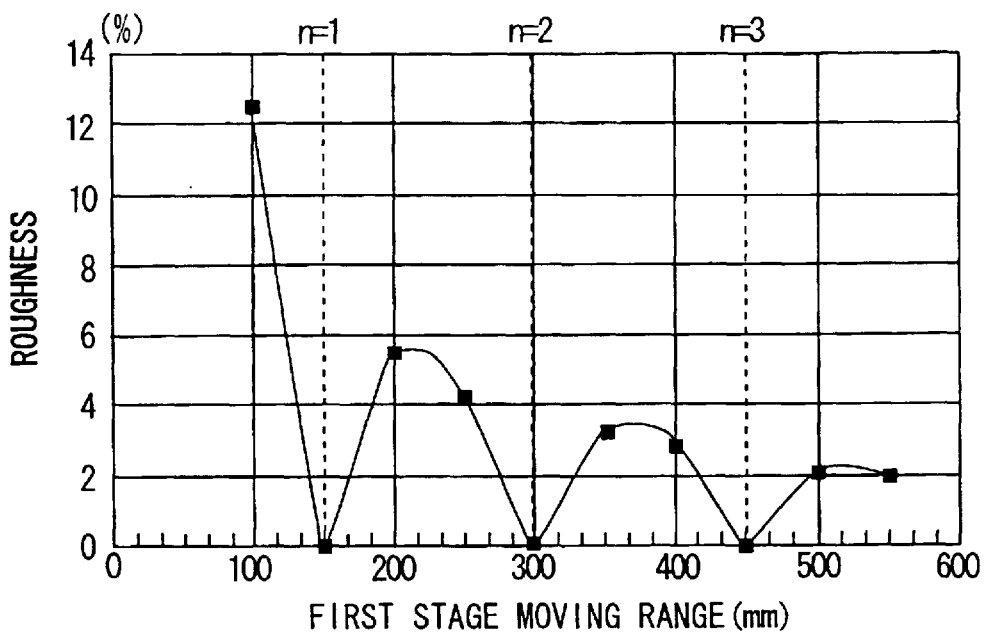
FIG. 6 shows the relationship between the roughness of the surface of the glass base material 4 and the first stage moving range.

FIG. 6 shows the relationship between the roughness of the surface of the glass base material 4 and the first stage moving range. The interval between each of the burners 62–70 is fixed to 150 mm. The second stage moving range is also fixed to 150 mm. The first stage moving range is varied every 50 mm, from 100 mm to 550 mm. When the first stage moving range is 0150 mm, 300 mm, and 450 mm, which are the integer multiple of 150 mm, which is the same value as the interval D1 between each of the burners 62–70, the roughness is 0%. In FIG. 6, except the first stage moving range which is the integer multiple of D1, the roughness decreases with the increase of the first stage moving range. However, the roughness is the least when the first stage moving range is an integer multiple of the interval D1. Therefore, it is preferable to set the first stage moving range to an integer multiple of the interval D1 of the burners 62–70.

Figure 7:
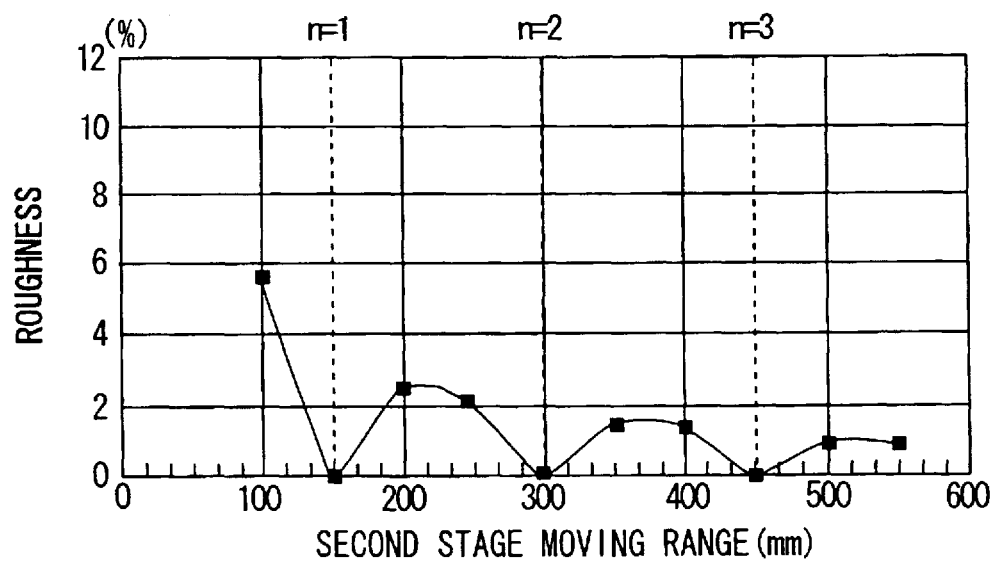
FIG. 7 shows the relationship between the roughness of the surface of the glass base material 4 and the second stage moving range.

FIG. 7 shows the relationship between the roughness of the surface of the glass base material 4 and the second stage moving range. The interval between each of the burners 62–70 is fixed to 150 mm. The first stage moving range is also fixed to 150 mm. The second stage moving range is varied for every 50 mm from 100 mm to 550 mm. When the second stage moving range is 150 mm, 300 mm, and 450 mm, which are the integer multiple of 150 mm, which is the same value as the interval between each of the burners 62–70, the roughness is 0%. In FIG. 7, except the second stage moving range which is the integer multiple of D1, the roughness decreases with the increase of the second stage moving range. However, the roughness is the least when the second stage moving range is an integer multiple of the interval D1. Therefore, it is preferable to set the second stage moving range to an integer multiple of the interval D1 of the burners 62–70. Thus it is preferable to set either of the first stage moving range or the second stage moving range to be an integer multiple of the interval D1 between each of the burners 62–70, such as 150 mm, 300 mm, 450 mm, and so on.

Figure 8:
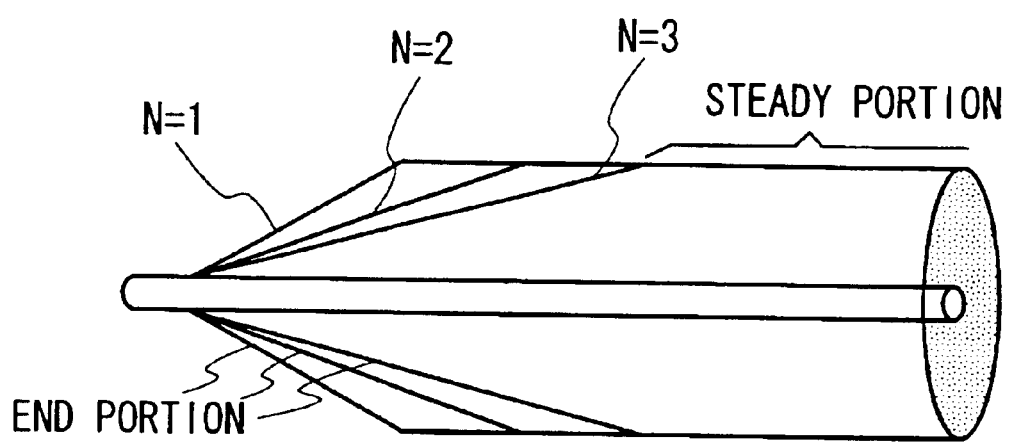
FIG. 8 shows the relationship between the length of the end portion and the moving range of the burners 62–70.

FIG. 8 shows the relationship between the length of the end portion and the moving range of the burners 62–70. The moving range of the burners 62–70 is set to the integer multiple of the interval D1 between each of the burners 62–70. Here, the number of the integer is expressed as "N" in FIG. 8. The length of the end portion increases with the increase of the number N. Because the end portion cannot be used for optical fibers effectively, the end portion is preferably as small as possible. Therefore the number N, which is a value of the integer, is preferably "1" or the number of all the burners 62–70 divided by five.

Figure 9:
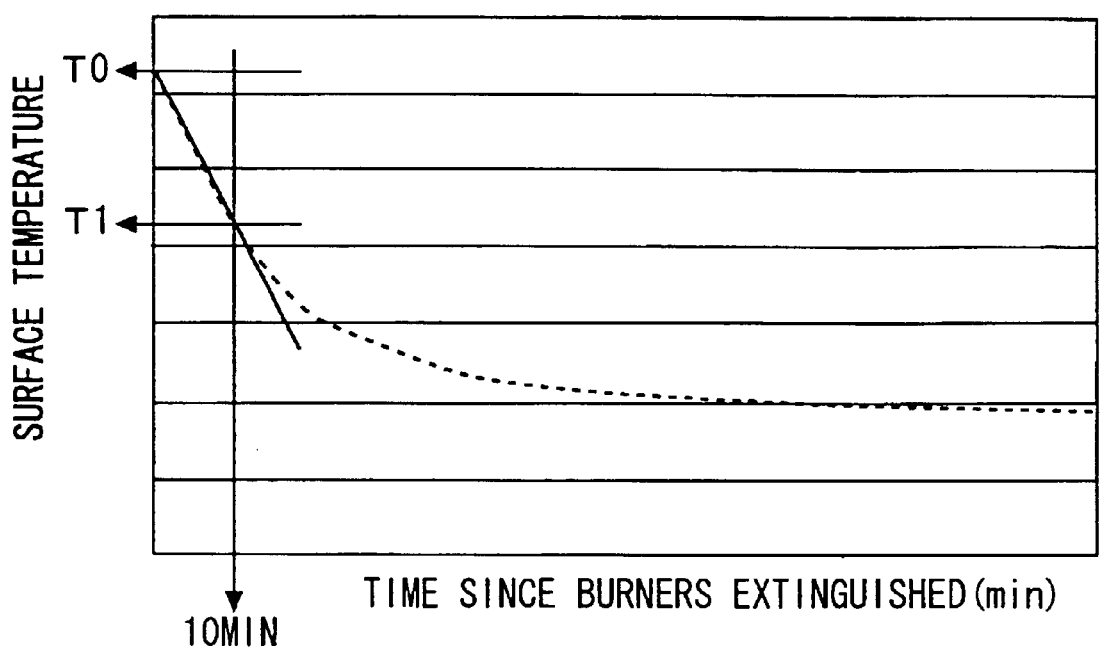
FIG. 9 shows the relationship between the surface temperature of the glass base material 4 and time, after the burners 62–70 were extinguished.

FIG. 9 shows the relationship between the surface temperature of the glass base material 4 and time, after the burners 62–70 were extinguished. The X-axis shows the time after extinguishing the burners 62–70, and the Y-axis shows the surface temperature of the glass base material 4.

The surface temperature at the time of extinguishing the burners 62–70 is represented as $T_0$° C., and the surface temperature ten minutes after extinguishing the burners 62–70 is represented as $T_1$° C. The speed of cooling the surface of the glass base material 4 is represented as C (° C./min). Furthermore, the cooling speed C can be defined by $C=(T_0-T_1)/10$. As shown in FIG. 9, after the completion of extinguishing the burners 62–70, the surface temperature of the glass base material 4 decreases.

A cracking may occur on the glass base material 4 when the surface temperature decreases rapidly during the cooling process, because of the difference of temperature between the surface and the core of the glass base material 4 caused by the rapid decrease of the surface temperature. Therefore, it is important to control the surface temperature of the glass base material 4 during the cooling process, in order to reduce the difference of the temperature between the surface and the core of the glass base material 4. As a parameter for controlling the surface temperature of the glass base material 4, there is a speed for cooling the glass base material 4. Especially, the cooling speed during the initial ten minutes after extinguishing the burners 62–70 is a good parameter to be controlled, for preventing cracking the glass base material 4.

Figures 10A, 10B:
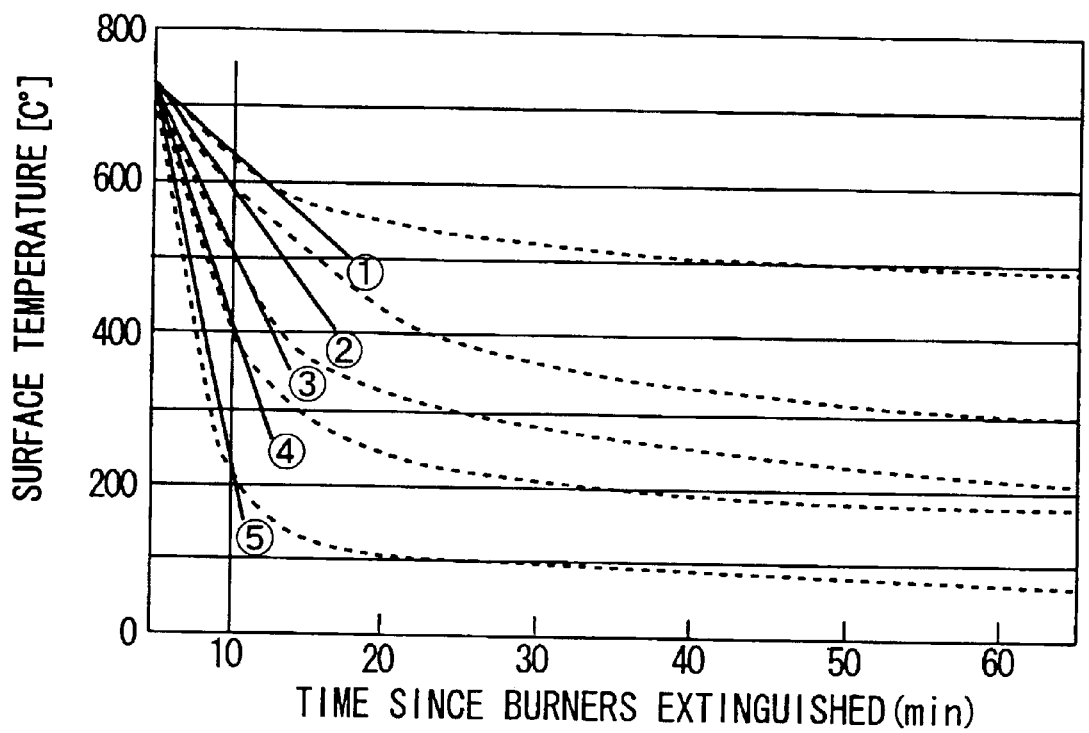
FIG. 10A shows relationship between the surface temperature of the glass base material 4 and time, for each different cooling speed of examples from 1 to 5.
FIG. 10B shows a relation between the cooling speed and crack occurrence on the surface of the glass base material 4, for each of examples 1 to 5.

FIG. 10A shows the relationship between the surface temperature of the glass base material 4 and the time after extinguishing the burners 62–70 for each different cooling speed of examples from 1 to 5. The broken lines show the change of temperature with time for each cooling speed of five examples. The solid lines show the cooling speed in each of five examples, as the inclination of the temperature $T_0$–$T_1$ during the initial 10 minutes after extinguishing the burners 62–70, as shown in FIG. 9.

The cooling speed C can be controlled by regulating the flow rate of the airflow flowing from the air holes 58. The flow rate of the airflow, which is flows from the air holes 58, can be regulated by controlling the number of air holes 58 to be opened, or by controlling the total area of the opening the vents 48 of the top duct 42 and the vents 56 of the side duct 50.

Here, the total area of the opened vents 48 is controlled in order to control the air which flows into the chamber 2. The example number 1 shows the change of the surface temperature when all of the vents 48 are closed so that outside air does not flow into the chamber 2, after extinguishing the burners 62–70. The example number 2 shows the change of the surface temperature when one eighth of the total area of the vents 48 is opened. The example number 3 shows the change of the surface temperature when a quarter of the total area of the vents 48 is opened. The example number 4 shows the change of the surface temperature when half of the total area of the vents 48 is opened. The example number 5 shows the change of the surface temperature when the vents 48 are fully opened. The inclination of each of the solid lines shown in FIG. 10A shows the cooling speed C for each of the examples.

FIG. 10B shows a relationship between the cooling speed and crack occurrence, which indicates whether a cracking occurred on the surface of the glass base material 4 for each of the examples. Because the total area of the vents 48 are not fully opened for examples 1 to 4, the cooling speed C of the examples 1 to 4 does not exceed 30° C./min. Because the example 5 fully opens the vents 48, the cooling speed C of the example 5 exceeds 30° C./min.

When the cooling speed C does not exceed 30° C./min, as in the examples 1 to 4, no cracks occur on the surface of the glass base material 4. When the cooling speed C exceeds 30° C./min, as in the example 5, cracks occur on the surface of the glass base material 4.

Therefore, it is important to keep the cooling speed C to slower than 30° C./min to prevent cracking occurring on the surface of the glass base material 4. If the cooling speed C exceeds 30° C./min, the difference of the temperature between the surface and the core of the glass base material 4 increases. This difference of temperature causes shrinkage at the surface of the glass base material 4, which causes a crack on the surface of the glass base material 4.

Figure 11:
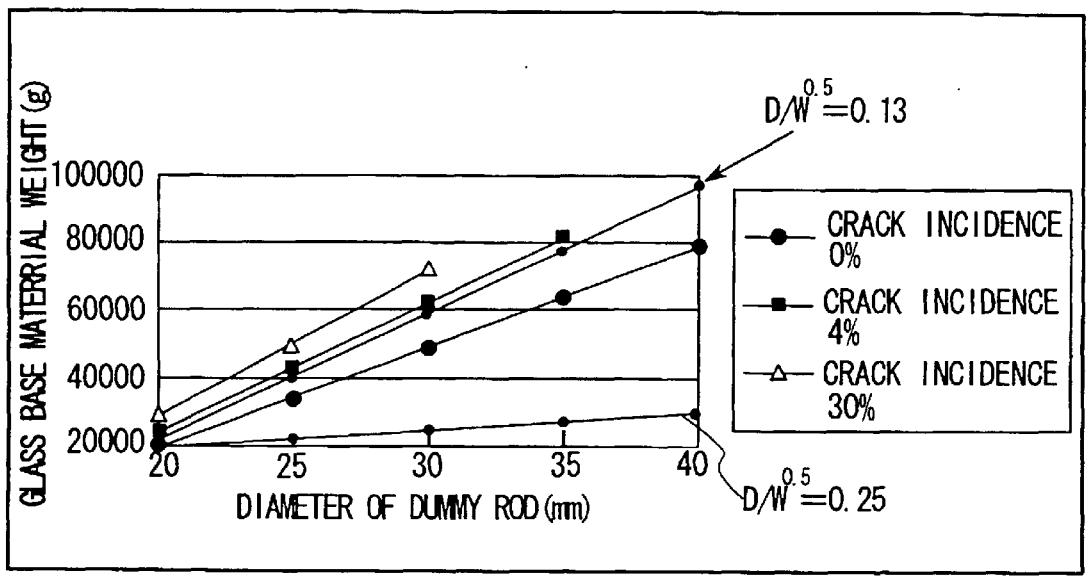
FIG. 11 shows a relationship between the diameter, D, of the dummy rod 40, and the weight, W, of glass base material 4.

FIG. 11 shows a relationship between the diameter, D, of the dummy rod 40, and the weight, W, of the glass base material 4 to be manufactured, for each of the cases of crack incidence of 0%, 4%, and 30%. The X-axis shows the diameter, D, of a dummy rod 40. The Y-axis shows the weight, W, of the glass base material 4 to be manufactured. The crack incidences are shown at each of the diameters, D, of 20 mm, 25 mm, 30 mm, 35 mm, and 40 mm.

As shown in FIG. 11, the crack incidence is influenced by the relationship of the diameter D of the dummy rod 40 divided by the root of the weight W of the glass base material 4, which is $D/W^{0.5}$. When $D/W^{0.5}$ is smaller than 0.13, as shown in the square points of the crack incidence of 4% and the triangular points of the crack incidence of 30%, cracking occurred. If $D/W^{0.5}$ is larger than the 0.13, cracking does not occur as shown in the circular points of the crack incidence 0%. Therefore, by using a dummy rod 40 that has a diameter D, which satisfies the relationship $D/W^{0.5} \geq 0.13$, the occurrence of cracking can be prevented. Moreover, cracking can also be prevented by controlling the weight W of the glass base material 4 to be manufactured, so that the relationship of $D/W^{0.5}$ is larger than 0.13.

The relationship of $D/W^{0.5}$ is preferably as small as possible. However, if using the dummy rod 40, the $D/W^{0.5}$ of which is larger than the 0.25, the diameter of the dummy rod 40 becomes extremely large compared to the diameter of the glass base material 4. Therefore, it is not economical to use the dummy rod 40, the $D/W^{0.5}$ of which is larger than 0.25. Therefore, the relationship between the diameter of the dummy rod 40 and the weight of the glass base material 4 is preferably $0.25 \geq D/W^{0.5} \geq 0.13$.

A base rod 38 having a pair of dummy rods 40 on each of its ends was tested. The diameter D of the dummy rod 40 was 35 mm. The gas material, $SiCl_4$, and the fuel gas, $H_2$ and $O_2$ were hydrolyzed by the burners 62–70. The glass base material 4 was accumulated on the base rod 38 until the weight W of the glass base material 4 became 70 kg. The value of the $D/W^{0.5}$ in the test was $(35/70000^{0.5})=0.132$, which was larger than 0.13. There were no cracks found on the glass base material 4 manufactured by this test.

Although the present invention has been described by way of exemplary embodiments, it should be understood that many changes and substitutions may be made by those skilled in the art without departing from the spirit and the scope of the present invention which is defined only by the appended claims.

What is claimed is:

1. An apparatus for manufacturing glass base material, comprising:
   a chamber, which further comprises:
   a) a base rod, around and along which the glass base material is formed;
   b) a burner that hydrolyzes and accumulates a gas material around and along the base rod;
   c) a first burner-moving unit that moves the burner in a direction parallel with a longitudinal direction of the base rod;
   d) a second burner-moving-unit that moves the first burner-moving-unit in a same moving direction of the first burner-moving-unit;
   e) a duct that exhausts exhaust from inside the chamber, wherein the duct is provided along the longitudinal direction of the base rod for substantially whole length of the chamber; and
   f) a base having a flow regulating stricture which intakes outside air, thus regulating airflow flowing from the base to the duct, wherein the flow regulating structure is formed from a plate having a plurality of air holes.

2. The apparatus according to claim 1, wherein the chamber has a tube shape with closed ends, and wherein the tube shape is substantially parallel to the base rod.

3. The apparatus according to claim 2, wherein a cross section of the tube is substantially polygonal.

4. The apparatus according to claim 2, wherein a cross section of the tube is substantially cylindrical.

5. The apparatus according to claim 1, wherein the base rod has at least on dummy rod provided on at least one end of the base rod, wherein a diameter of the dummy rod, D, and a weight of the glass base material, W, has a relationship of $0.13 \leq D/W^{0.5}$.

6. The apparatus according to claim 5, wherein the base rod has at least one dummy rod provided on at least one end of the base rod, wherein a diameter of the dummy rod, D, and a weight of the glass base material, W, has a relationship of $0.13 \leq D/W^{0.5} \leq 0.25$.

7. The apparatus according to claim 1, wherein the burner further comprises a plurality of burners arranged parallel to the longitudinal direction of the first burner-moving unit.

8. The apparatus according to claim 7, wherein the plurality of burners are separated by intervals that are substantially constant.

9. The apparatus according to claim 8, wherein a moving range of at least one of the first burner-moving-unit and the second burner-moving-unit is an integer multiple of each of the intervals between the plurality of burners.

10. The apparatus according to claim 9, wherein the integer does not exceed a number of the plurality of burners divided by five.

11. The apparatus according to claim 10, wherein the integer is 1.

12. The apparatus according to claim 1, wherein the first burner-moving-unit moves the burner at a first cycle and the second burner-moving-unit moves the first burner-moving-unit at a second cycle, wherein the second cycle is different from the first cycle.

13. The apparatus according to claim 12, wherein the cycle is shorter than the second cycle.

14. The apparatus according to claim 13, wherein the second cycle is an integer multiple of the first cycle.

15. The apparatus according to claim 13, wherein the first cycle is synchronized with the second cycle.

16. The apparatus according to claim 1, wherein the first burner-moving-unit further comprises a first shaft, along which the first burner-moving-unit moves, and wherein the second burner-moving-unit further comprises a second shaft, along which the second burner-moving-unit moves.

17. The apparatus according to claim 16, wherein the first burner-moving-unit further comprises a first motor, which rotated the first shaft, and wherein the second burner-moving-unit further comprises a second motor, which rotates the second shaft.

18. The apparatus according to claim 1, wherein the duct is at a top of the chamber.

19. The apparatus according to claim 1, wherein the duct comprises a vent plate, wherein the vent plate further comprises a plurality of vents for the substantially whole length of the chamber.

20. The apparatus according to claim 19, wherein the plurality of vents are separated by a substantially constant interval.

21. The apparatus according to claim 19, wherein the vent plate further comprises a vent controller to control airflow of the plurality of vents.

* * * * *

UNITED STATES PATENT AND TRADEMARK OFFICE
CERTIFICATE OF CORRECTION

PATENT NO. : 6,672,112 B2
DATED : January 26, 2004
INVENTOR(S) : Tobisaka et al.

It is certified that error appears in the above-identified patent and that said Letters Patent is hereby corrected as shown below:

Column 14,
Line 43, "stricture" should be -- structure --
Line 56, first occurrence of "on" should be -- one --

Column 15,
Line 19, before first occurrence of "cycle" insert -- first --
Line 21, "second" should be -- first --
Line 21, "first" should be -- second --

Column 16,
Line 8, "rotated" should be -- rotates --

Signed and Sealed this

Second Day of November, 2004

JON W. DUDAS
*Director of the United States Patent and Trademark Office*